United States Patent [19]
Musk et al.

[11] Patent Number: 6,108,650
[45] Date of Patent: Aug. 22, 2000

[54] METHOD AND APPARATUS FOR AN ACCELERATED RADIUS SEARCH

[75] Inventors: Elon Musk, Palo Alto; King-Sun Wai, Santa Clara; Leo Chan, Belmont, all of Calif.

[73] Assignee: MyWay.com Corporation, Andover, Mass.

[21] Appl. No.: 09/138,185

[22] Filed: Aug. 21, 1998

[51] Int. Cl.[7] .................................................. G06F 17/30
[52] U.S. Cl. ........................................ 707/4; 707/3; 707/7
[58] Field of Search .................................. 707/4, 1, 3, 7; 340/825–49; 370/254–258

[56] References Cited

U.S. PATENT DOCUMENTS

| | | | |
|---|---|---|---|
| 5,032,989 | 7/1991 | Tornetta | 364/401 |
| 5,410,485 | 4/1995 | Ichikawa | 364/444 |
| 5,471,392 | 11/1995 | Yamashita | 364/443 |
| 5,839,088 | 11/1998 | Hancock et al. | 701/213 |
| 5,852,810 | 12/1998 | Sotiroff et al. | 705/27 |
| 6,002,853 | 12/1999 | de Hond | 395/200.49 |
| 6,021,406 | 2/2000 | Kuznetsov | 707/6 |

FOREIGN PATENT DOCUMENTS 10021257A  1/1998  Japan ............................... G06F 17/30

OTHER PUBLICATIONS

Tobe et al, "An Intelligent Directory System with a Genre Inference Function", IEEE May 1996, pp. 694–697.
International Search Report, PCT/US99/17067, Oct. 22, 1999.

*Primary Examiner*—Thomas G. Black
*Assistant Examiner*—Uyen Le
*Attorney, Agent, or Firm*—Blakely, Sokoloff, Taylor & Zafman LLP

[57] ABSTRACT

A method and apparatus for performing an accelerated radius search. A search category is built having a density value corresponding to a geographic area. A first search radius is generated based upon the category, and the first search radius is used to perform a first search. If the first search returns an insufficient number of results, a second search radius is generated by using an heuristic to increase the first search radius, and the second search radius is used to perform a second search. The search is repeated until a desired results set is returned.

21 Claims, 2 Drawing Sheets

METHOD AND APPARATUS FOR AN ACCELERATED RADIUS SEARCH

FIELD OF THE INVENTION

This invention relates generally to computerized search systems, and more particularly to a method and apparatus for performing an accelerated radius search.

BACKGROUND OF THE INVENTION

Modern computerized search systems can contain vast amounts of data. In order to be useful, they must return search results to a user in a reasonable amount of time. One application for computerized search systems is that of finding geographic entities such as an address, street, area, point, businesses, or list of cities that are located near a given starting point. For example, with a system containing a database of homes and businesses with corresponding addresses or geographical locations within a city, a user may want to locate banks, automated teller machines (ATMs), or restaurants which are close to a specific address or business within the city. Because the user may be waiting for the results of the search in real-time, the search results must be returned very quickly. In addition, the results should preferably be presented in an ordered format according to the usefulness to the user. For example, some businesses might have a sale or special offering which should be presented to the user before other businesses which do not have a sale or special.

Known search systems typically pre-define the search radius to be used when searching. If no match is found, the user must manually increment the search radius by a pre-defined amount and repeat the search. These types of systems are generally slow because they require multiple unnecessary searches and user interaction going from a smaller to a larger search radius. In addition, by pre-defining the search radius, traditional systems may return a larger number of records than necessary for densely populated areas such as cities. Sorting a large number of records is computationally intensive and will typically delay getting search results to the user.

Therefore, there is a need for an efficient way of searching a large amount of data and returning the search results to a user in an ordered format.

SUMMARY OF THE INVENTION

The present invention provides a method and apparatus for performing an accelerated radius search. A search category is built having a density value corresponding to a geographic area. A first search radius is generated based upon the category, and the first search radius is used to perform a first search. If the first search returns an insufficient number of results, a second search radius is generated by using an heuristic to increase the first search radius, and the second search radius is used to perform a second search. The search is repeated until a desired results set is returned.

BRIEF DESCRIPTION OF THE DRAWINGS

The present invention is illustrated by way of example and may be better understood by referring to the following description in conjunction with the accompanying drawings, in which like references indicate similar elements and in which.

DETAILED DESCRIPTION OF AN EMBODIMENT OF THE PRESENT INVENTION

In the following description of a preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. A preferred embodiment of the present invention, described below, enables a remote computer system user to execute a software application on a network file server.

In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description.

The present invention provides a method and apparatus for performing an accelerated radius search. A search category is built having a density value corresponding to a geographic area. The density factor is generated for the category as a function of a given geographic region such as state, city, or zip code. A first search radius is generated based upon the category, and the first search radius is used to perform a first search. If the first search returns an insufficient number of results, a second search radius is generated by using an heuristic to increase the first search radius, and the second search radius is used to perform a second search. The search radius is automatically increased or decreased depending on the number of records returned in the first search results. With the present invention, the search results are obtained very quickly and are ordered according to relevance to the user, which is typically defined by the distance from the starting point.

Hardware Environment

Figure 1:
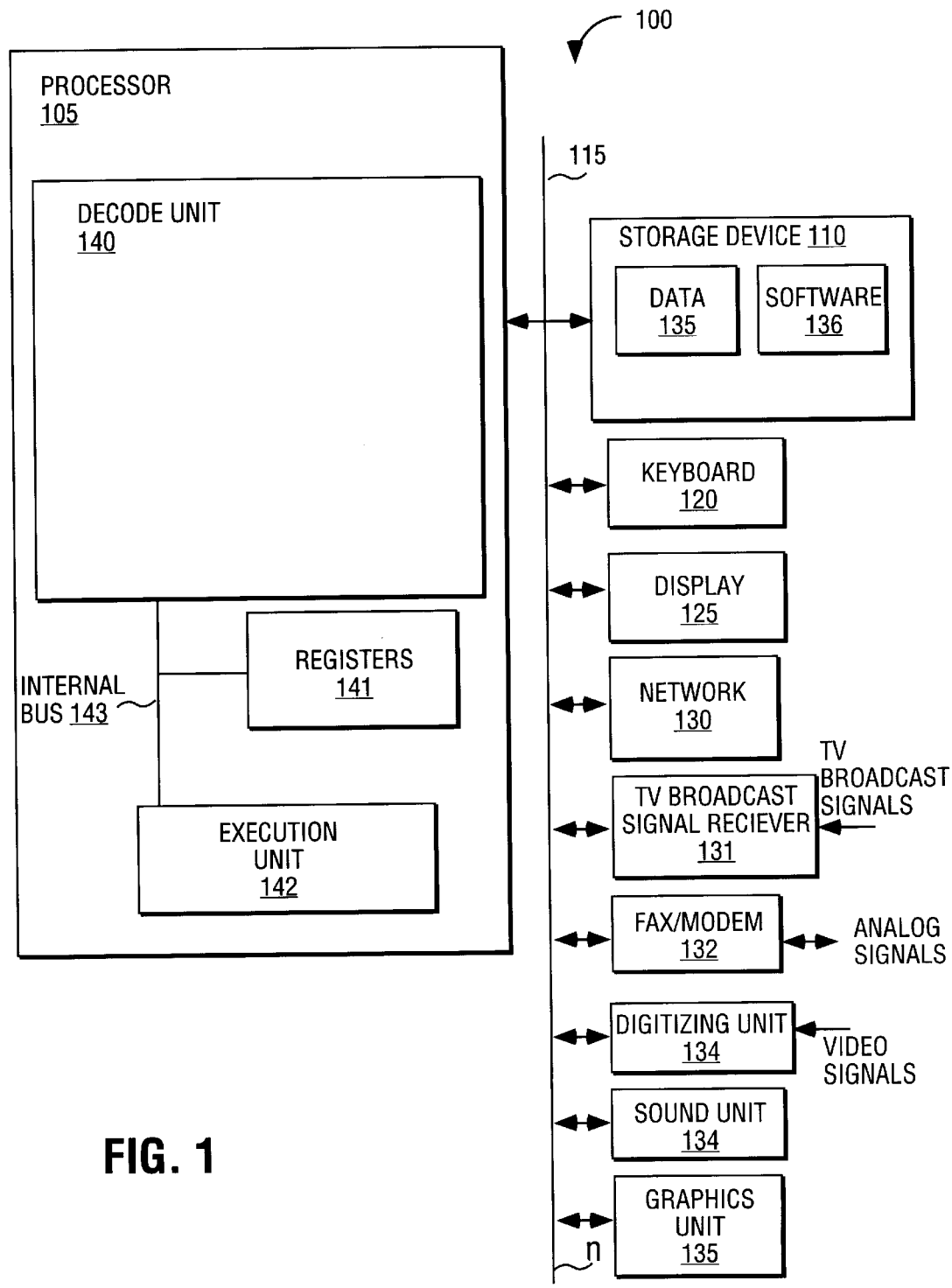
FIG. 1 is a system diagram which shows a computer hardware environment compatible with the present invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. In addition, a number of user input/output devices, such as a keyboard 120 and a display 125, are also coupled to the bus 115. The processor 105 represents a central processing unit of any type of architecture, such as CISC, RISC, VLIW, or hybrid architecture. In addition, the processor 105 could be implemented on one or more chips. The storage device 110 represents one or more mechanisms for storing data. For example, the storage device 110 may include read only memory (ROM), random access memory (RAM), magnetic disk storage mediums, optical storage mediums, flash memory devices, and/or other machine-readable mediums. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

In addition to other devices, one or more of a network 130, a TV broadcast signal receiver 131, a fax/modem 132, a digitizing unit 133, a sound unit 134, and a graphics unit 135 may optionally be coupled to bus 115. The network 130 and fax modem 132 represent one or more network connections for transmitting data over a machine readable media (e.g., carrier waves). The digitizing unit 133 represents one or more devices for digitizing images (i.e., a scanner camera, etc.). The sound unit 134 represents one or more devices for inputting and/or outputting sound (e.g., microphones, speakers, magnetic storage devices, optical storage devices, etc.). The graphics unit 135 represents one or more devices for generating 3-D images (e.g., graphics card).

FIG. 1 also illustrates that the storage device 110 has stored therein data 135 and software 136. Data 135 represents data stored in one or more of the formats described herein. Software 136 represents the necessary code for performing any and/or all of the techniques described with reference to FIG. 3–6. It will be recognized by one of ordinary skill in the art that the storage device 110 preferably contains additional software (not shown), which is not necessary to understanding the invention.

FIG. 1 additionally illustrates that the processor 105 includes decode unit 140, a set of registers 141, and execution unit 142, and an internal bus 143 for executing instructions. It will be recognized by one of ordinary skill in the art that the processor 105 contains additional circuitry, which is not necessary to understanding the invention. The decode unit 140, registers 141 and execution unit 142 are coupled together by internal bus 143. The decode unit 140 is used for decoding instructions received by processor 105 into control signals and/or microcode entry points. In response to these control signals and/or microcode entry points, the execution unit 142 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The registers 141 represent a storage are on processor 105 for storing information, including control/status information, integer data, floating point data, and packed data. It will be understood by one of ordinary skill in the art that one aspect of the invention is the described instruction set for operating on packed data. According to this aspect of the invention, the storage area used for storing the packed data is not critical. The term data processing system is used herein to refer to any machine for processing data, including the computer systems(s) described with reference to FIG. 1.

Figure 2:
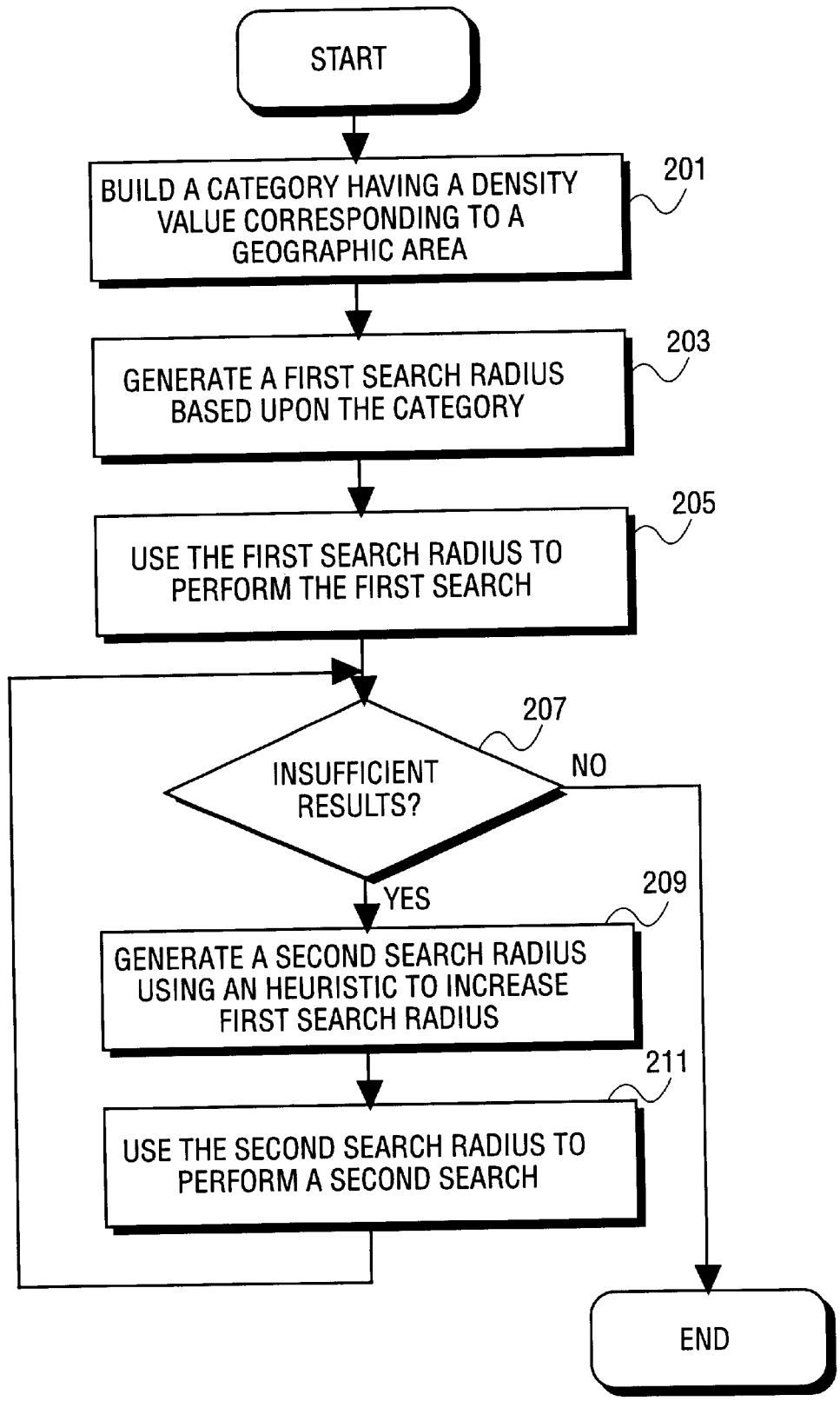
FIG. 2 is a flowchart which shows a method for performing an accelerated radius search compatible with the present invention.

As shown in FIG. 2, the present invention provides an accelerated way to perform a radius search. At step 201, one or more categories in a locations database are built from geographical entities such as an address, street, area, point, businesses, or list of cities. Typically categories include, but are not limited to, banks, ATMs, restaurants, service stations, doctors, dentists, dry cleaners, etc. It will be recognized by one of ordinary skill in the art that a wide variety of categories other than those discussed above may be used with the present invention without loss of generality. Typical geographic areas include, but are not limited to, state, county, city, zip code, city block, subway stop, elevated train line, canal, river, etc. It will be recognized by one of ordinary skill in the art that a wide variety of geographic areas other than those discussed above may be used with the present invention without loss of generality. An initial search radius is typically pre-built for each category. The initial search radius depends on a category density value, which is a function of the category and geographic area. The initial search radius for a relatively frequent category, such as restaurants, will typically be less than the initial search radius for a relatively infrequent category, such as taxidermy shops. The initial search radius for a relatively small geographic area, such as zip code, will typically be less than the initial search radius for a relatively large geographic area, such as city. The number of geographical areas determines the storage requirements for the locations database. Larger geographic areas within the database typically mean the overall number of areas is less, and therefore require less storage area to store. Smaller geographic areas, which typically mean the overall number of areas is greater, require more storage area to store.

The locations database typically includes a data structure with a geocode or the geographical location of a physical location. The geocode is typically represented by a latitude and longitude, but it will be recognized by one of ordinary skill in the art that other coordinate systems such as a polar coordinate system or a local Cartesian coordinate system may be used with the present invention without loss of generality. It will be recognized by one of ordinary skill in the art that spatial indexes may be used with the locations database to speed up user queries. Typical well-known spatial indexes are based on R-Tree or Quad-Tree algorithms, and may be easily integrated in the present locations database. Commercial spatial index software may also be used from commercial software companies such as Oracle and Informix. It will be recognized by one of ordinary skill in the art that the locations database may be implemented with one or more many different database formats, including but not limited to, a relational database, a flat file database, or a hierarchical database, without loss of generality.

The locations database also typically includes a data structure with an information density value, which contains information about the density of a given attribute in a given geographical area. In typical applications using an embodiment of the present invention, the relevant attributes are business categories and keywords in a company name. These attributes are usually provided by a user as part of the user's search query. The locations database may also include the total number of records for a given category.

The locations database may also include relevance data associated with individual records within a given category. The relevance data may be used to order search results that are presented to the user. Typically, search results may be presented in order of increasing distance from the starting point of the search. However, the relevance data may also be used to alter the order based upon other criteria or additional criteria. For example, in the category of department stores, the relevance data for an individual record of a department store may indicate that the store is having a sale. In this case, the individual record for that department store may be listed before that of other stores, even though other stores may be closer to the starting point.

The present invention uses the locations database to perform the radius search as shown in FIG. 2. At step 203, a first search radius is generated based upon the category and any other key word information provided by the search query. The first search radius is based upon a geographic location near the starting point. In one embodiment of the present invention, the first search radius may be limited by a minimum search size, defined as a circle with a radius of 1 mile, and a maximum search size, defined as a circle with a radius of 100 miles. If the first search size is smaller than minimum size, the minimum size is used. If the first search size is larger than the maximum size, the maximum size is used, and the method then terminates after the search. Both minimum and maximum search radius are typically software configurable by system administrators. It will be recognized by one of ordinary skill in the art that other values for a minimum search size and maximum search size may be used with the present invention without loss of generality.

The present invention preferably generates an approximated density value for the search, where the density value is typically the number of records in a geographical region divided by the region size. The total number of records in any geographical region and the size of the region are preferably contained in the locations database. The present invention uses the density value to generate the first search radius. The number of records needed for the search results is typically dependent on how many records are to be displayed to the user at one time. For example, 15 records are typically required to fill one page of information displayed to the user. The first search size may be generated by the number of records needed divided by the density value.

At step 205, the first search is performed using the first search radius. At step 207, if the first search returned an insufficient number of records, a second search radius is generated at 209. In one embodiment of the present invention, the minimum search area defined by the minimum search radius is increased to twice the previous minimum search area. Thus, the new minimum search radius is increased to the old minimum search radius multiplied by the square root of two. The maximum search radius typically remains unchanged as a circle with a radius of 100 miles. It will be recognized by one of ordinary skill in the art that other heuristics for increasing or decreasing the size of the minimum search area, such as multiplication of the minimum search radius by a factor other than the square root of two or changing the geometrical dimensions of the minimum search area, may be used without loss of generality.

To generate the second search radius, a new density value is calculated. It may be assumed that the last density value was too high for retrieving records around the starting point since the previous search returned fewer records then expected. The new density value is typically calculated by the number of results returned from the previous search divided by the previous search size. It will be recognized by one of ordinary skill in the art that the approximation of the density value can be improved if all previous search result pairs are used to project the new density. If the new density results in a radius that is smaller than the new minimum search radius, the new minimum search radius is used. If the new density results in a radius that is larger than the maximum search radius, the maximum search radius is used and the method terminates after the search.

At step 211, the present invention uses the second search radius to perform a second search. Flow control then returns to step 207. If at step 207 the search returns a sufficient number of records, the records are ordered according to the relevance to the user as described above, and the method terminates.

While the invention is described in terms of preferred embodiments in a specific system environment, those of ordinary skill in the art will recognize that the invention can be practiced, with modification, in other and different hardware and software environments within the spirit and scope of the appended claims.

What is claimed is:

1. A computer implemented method for performing an accelerated radius search comprising:
    building a category having a density value corresponding to a geographic area;
    generating a first search radius based upon the category;
    using the first search radius to perform a first search; and
    if the first search returns an insufficient number of results,
        generating a second search radius by using an heuristic to increase the first search radius; and
        using the second search radius to perform a second search.

2. The method of claim 1 wherein building a category further comprises building a search radius for the category.

3. The method of claim 1 wherein using the first search radius to perform a first search further comprises using a geographical location and the first search radius to perform the first search.

4. The method of claim 1 wherein generating a second search radius further comprises expanding the first search radius based upon the density value of the category.

5. The method of claim 1 further comprising defining a minimum search size and a maximum search size.

6. The method of claim 1 further comprising generating the density value by determining a total number of records in a geographical region divided by the region size.

7. The method of claim 1 further comprising ordering the result of either the first or second search according to relevance data.

8. An apparatus for performing an accelerated radius search comprising:
    a data receiver for receiving data representing geographic locations;
    a processor coupled to the data receiver;
    a category builder coupled to the processor to build a category having a density value corresponding to a geographic area;
    a search radius generator coupled to the processor to generate a first search radius based upon the category;
    a storage device coupled to the processor and having stored therein a routine, which when executing by the processor, causes the processor to at least,
        use the first search radius to perform a first search; and
        if the first search returns an insufficient number of results,
            generate a second search radius by using an heuristic to increase the first search radius; and
            use the second search radius to perform a second search.

9. The apparatus of claim 8 wherein the category builder further comprises a radius builder to build a search radius for the category.

10. The apparatus of claim 8 wherein the storage device further causes the processor to use a geographical location and the first search radius to perform the first search.

11. The apparatus of claim 8 wherein the storage device further causes the processor to generate a second search radius by expanding the first search radius based upon the density value of the category.

12. The apparatus of claim 8 wherein the storage device further causes the processor to define a minimum search size and a maximum search size.

13. The apparatus of claim 8 wherein the storage device further causes the processor to generate the density value by determining a total number of records in a geographical region divided by the region size.

14. The apparatus of claim 8 wherein the storage device further causes the processor to order the result of either the first or second search according to relevance data.

15. An article of manufacture for use in a computer system, the article of manufacture comprising a computer usable medium having computer readable program code means embodied in the medium, the program code means including:

- computer readable program code means embodied in the computer usable medium for causing a computer to build a category having a density value corresponding to a geographic area;
- computer readable program code means embodied in the computer usable medium for causing a computer to generate a first search radius based upon the category;
- computer readable program code means embodied in the computer usable medium for causing a computer to use the first search radius to perform a first search; and
- computer readable program code means embodied in the computer usable medium for causing a computer to, if the first search returns an insufficient number of results, generate a second search radius by using an heuristic to increase the first search radius; and
  - use the second search radius to perform a second search.

16. The article of manufacture of claim 15 wherein the means for causing a computer to build a category further comprises means embodied in the computer usable medium for causing a computer to build a search radius for the category.

17. The article of manufacture of claim 15 wherein the means for causing a computer to use the first search radius to perform a first search further comprises means embodied in the computer usable medium for causing a computer to use a geographical location and the first search radius to perform the first search.

18. The article of manufacture of claim 15 wherein the means for causing a computer to generate a second search radius further comprises means embodied in the computer usable medium for causing a computer to expand the first search radius based upon the density value of the category.

19. The article of manufacture of claim 15 further comprising means embodied in the computer usable medium for causing a computer to define a minimum search size and a maximum search size.

20. The article of manufacture of claim 15 further comprising means embodied in the computer usable medium for causing a computer to generate the density value by determining a total number of records in a geographical region divided by the region size.

21. The article of manufacture of claim 15 further comprising means embodied in the computer usable medium for causing a computer to order the result of either the first or second search according to relevance data.

* * * * *